(12) United States Patent
Zhu et al.

(10) Patent No.: US 11,082,343 B2
(45) Date of Patent: Aug. 3, 2021

(54) CLIENT CONNECTION FAILOVER

(71) Applicant: Oracle International Corporation, Redwood Shores, CA (US)

(72) Inventors: Ming Zhu, Redwood City, CA (US); Mehul D. Bastawala, Sunnyvale, CA (US)

(73) Assignee: Oracle International Corporation, Redwood Shores (CA)

( * ) Notice: Subject to any disclaimer, the term of this patent is extended or adjusted under 35 U.S.C. 154(b) by 0 days.

(21) Appl. No.: 17/071,866

(22) Filed: Oct. 15, 2020

(65) Prior Publication Data
US 2021/0029032 A1    Jan. 28, 2021

Related U.S. Application Data

(63) Continuation of application No. 16/165,416, filed on Oct. 19, 2018, now Pat. No. 10,855,587.

(51) Int. Cl.
*H04L 12/741* (2013.01)
*H04L 12/24* (2006.01)
*H04L 29/12* (2006.01)

(52) U.S. Cl.
CPC .......... *H04L 45/74* (2013.01); *H04L 41/0893* (2013.01); *H04L 41/12* (2013.01); *H04L 61/2007* (2013.01)

(58) Field of Classification Search
CPC ..... H04L 45/74; H04L 41/0893; H04L 41/12; H04L 61/2007
See application file for complete search history.

(56) References Cited

U.S. PATENT DOCUMENTS

| | | | |
|---|---|---|---|
| 7,450,498 B2 | 11/2008 | Golia et al. | |
| 7,451,072 B2 | 11/2008 | Rodriguez | |
| 9,438,604 B1 | 9/2016 | Addala et al. | |
| 10,108,522 B1 | 10/2018 | Jain et al. | |
| 2006/0087962 A1* | 4/2006 | Golia | H04L 61/00 370/216 |
| 2007/0136455 A1 | 6/2007 | Lee et al. | |
| 2009/0083737 A1 | 3/2009 | Ben-Yehuda et al. | |
| 2009/0106404 A1* | 4/2009 | Christenson | H04L 29/12952 709/222 |
| 2009/0138752 A1 | 5/2009 | Graham et al. | |

(Continued)

*Primary Examiner* — Jonathan A Bui
(74) *Attorney, Agent, or Firm* — Invoke

(57) ABSTRACT

The embodiments disclosed herein select and assign a floating IP address (FIP) to an application based on characteristics of the application. Floating IP addresses are assigned a classification, and one or more network adapters are mapped to a FIP according to the FIPs assigned classification. The endpoint of a connection for an application initiating a network connection with a target application may be assigned a floating IP address according to attributes of the application being consistent with the classification of a FIP. Applications may be grouped according to their respective classification, and the group of applications may share a corresponding FIP. FIPs may be dynamically configured for an application with mapped network adapters selected based on the attributes of the application. An application's characteristics may change during executions, and the network adapters mapped to the FIP assigned to the application's connection may be reassigned.

20 Claims, 5 Drawing Sheets

(56) References Cited

U.S. PATENT DOCUMENTS

| | | |
|---|---|---|
| 2009/0234957 A1 | 9/2009 | Li et al. |
| 2009/0327486 A1 | 12/2009 | Andrews et al. |
| 2010/0091676 A1 | 4/2010 | Moran et al. |
| 2010/0138544 A1 | 6/2010 | Guo et al. |
| 2010/0138567 A1 | 6/2010 | Haggar et al. |
| 2011/0191468 A1 | 8/2011 | Arashin et al. |
| 2012/0297237 A1 | 11/2012 | Chatterjee et al. |
| 2013/0033722 A1 | 2/2013 | Kamath et al. |
| 2013/0254761 A1 | 9/2013 | Reddy et al. |
| 2013/0339781 A1* | 12/2013 | Wamorkar .......... G06F 11/0757 714/4.2 |
| 2015/0112831 A1 | 4/2015 | Jackson et al. |
| 2016/0124665 A1 | 5/2016 | Jain et al. |
| 2016/0182401 A1 | 6/2016 | Dick et al. |
| 2016/0191304 A1 | 6/2016 | Muller |
| 2016/0269355 A1 | 9/2016 | Lee et al. |
| 2016/0364484 A1 | 12/2016 | Dong et al. |
| 2017/0046246 A1 | 2/2017 | Kaulgud et al. |
| 2017/0093965 A1* | 3/2017 | Evens .................... H04L 67/30 |
| 2017/0171150 A1 | 6/2017 | Shang |
| 2017/0286174 A1 | 10/2017 | Jiang |
| 2018/0025066 A1 | 1/2018 | Lui et al. |
| 2018/0034769 A1 | 2/2018 | Modi et al. |
| 2018/0039779 A1 | 2/2018 | Li et al. |
| 2018/0131605 A1 | 5/2018 | Jain |
| 2018/0225344 A1 | 8/2018 | Fang |
| 2018/0284735 A1 | 10/2018 | Cella et al. |
| 2018/0287912 A1* | 10/2018 | Zabarsky .............. G06F 3/0635 |
| 2019/0005047 A1 | 1/2019 | D'Amore et al. |
| 2019/0028403 A1 | 1/2019 | Moldvai et al. |
| 2019/0052551 A1 | 2/2019 | Barczynski et al. |
| 2019/0250938 A1 | 8/2019 | Claes et al. |
| 2019/0260669 A1 | 8/2019 | Zhu et al. |

\* cited by examiner

| Floating IP Address | Classification | Network Adapter |
|---|---|---|
| FIP 1 | High Priority | NA1, NA2, NA3, NA4 |
| FIP 2 | High Cost | NA3, NA4 |
| FIP 3 | High Speed | NA 4 |

Figure 2A

| Address Resolution | |
|---|---|
| FIP 1 | NA1 |
| FIP 2 | NA3 |
| FIP 3 | NA4 |

Figure 2B

CLIENT CONNECTION FAILOVER

INCORPORATION BY REFERENCE; DISCLAIMER

The following application is hereby incorporated by reference: application Ser. No. 16/165,416 filed on Oct. 19, 2018. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to reducing the cost of recovering from a connection failure between communicating applications. More specifically, the disclosure relates to selecting and assigning one of a set of floating IP addresses to an application based on characteristics of the application.

BACKGROUND

In a network of computers communicating with each other over a network connection, if a network card in one of the computers fails, a connection between a client application running on the computer with a failed network card and a server application running on a computer communicating with the client application can be lost. A connection failover mechanism can be expensive, especially when there is session state associated with the failed connection. For example, re-establishing a connection may involve (a) reconnecting a client to a server, (b) re-authenticating client user credentials at the server, (c) setting up the data type protocol for transferring data, (d) replaying cursor fetches, which may involve fetching many rows again and discarding ones seen already prior to failover, (e) replaying transactions, and (f) replaying session state such as altering session calls.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 2A is a diagram that illustrates the association between floating IP addresses and a multiple network adapters, in accordance with one or more embodiments;

FIG. 2B is a diagram that illustrates the association between floating IP addresses and the corresponding network adapter currently in use, in accordance with one or more embodiments;

DETAILED DESCRIPTION

Figure 1:
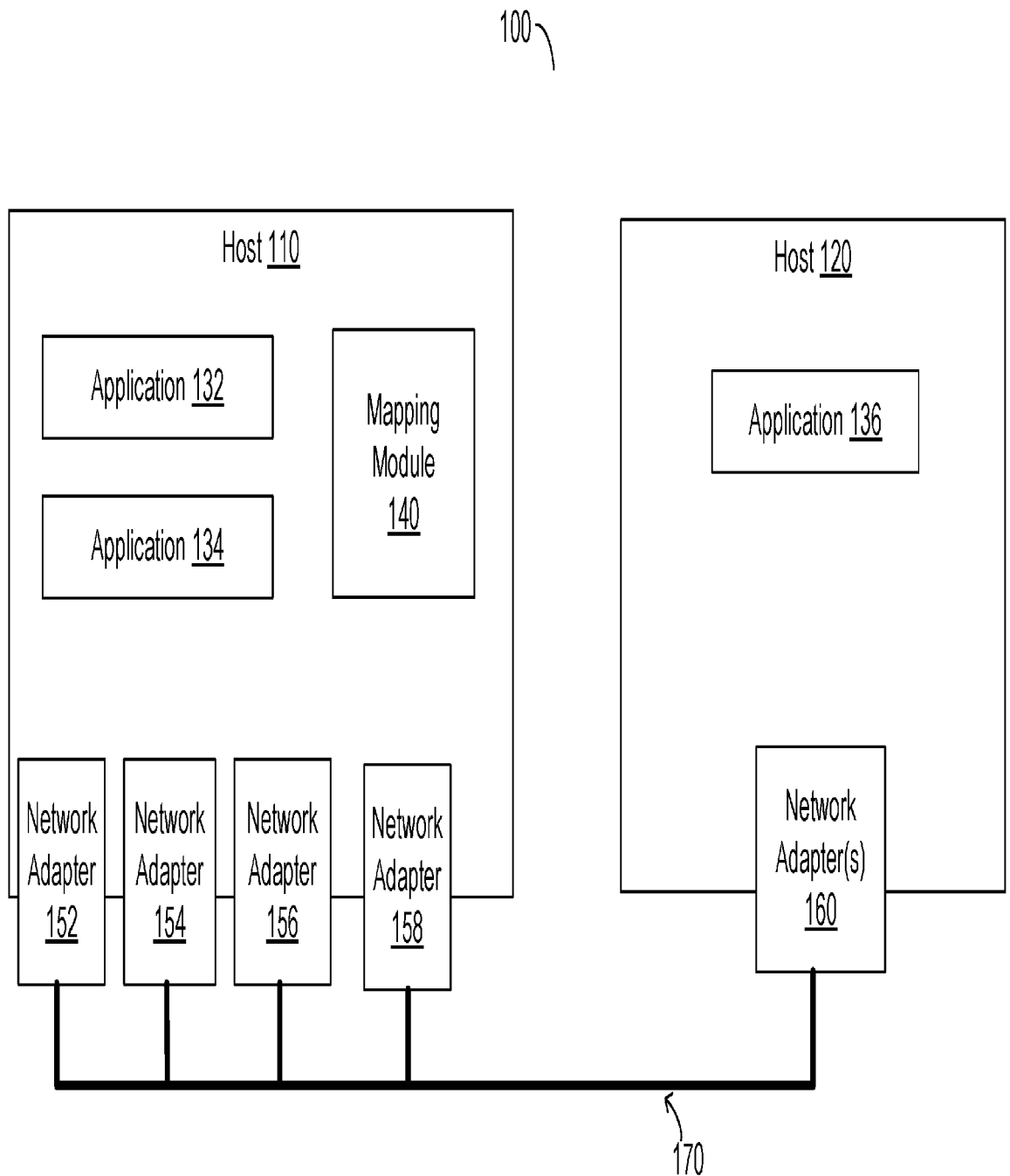
FIG. 1 is a block diagram that illustrates components of the system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

Embodiments provide fault tolerance of network connections using IP bonding at the application program level. A new IP address mapping module is introduced that uses operating-system supported IP bonding such as Linux OS IP bonding or Solaris IPMP. However, the new IP address mapping module intercepts an application connection request, and selects, based on attributes of the application, one or more floating IP addresses for the application's endpoint of the connection.

Embodiments implement a set of floating IP addresses with varying performance characteristics. Performance characteristics for a floating IP address may include, for example, connection reliability and connection speed. The performance characteristics for a floating IP address (or connection thereof) may be a function of the network adapter(s) mapped to the floating IP address. While a single network adapter is used for transmitting and receiving traffic for a connection associated with a floating IP address, any number of backup network adapters may be mapped to the floating IP address for taking over a corresponding connection in case the network adapter in use fails. One or more performance characteristics for a floating IP address may be directly proportional to the number of backup network adapters that are mapped to the floating address. Furthermore, characteristics, such as reliability (known past failures and quality of service guarantees) and speed vary across different network adapters. Performance characteristics for a floating IP address may be directly correlated to the performance characteristics of a network adapter that is in use for a connection associated with the floating IP address.

Each floating IP address (FIP) may be associated with a performance classification that indicates the type of applications that would qualify to use, or maximally benefit from, the set of network adapters mapped to the FIP. For example, multiple priority levels may be defined for FIPs and for applications. Each FIP is assigned a priority level. Applications designated as having a particular priority level may be assigned a FIP with a corresponding (or compatible) priority level.

A FIP may be assigned to an application based on various kinds of application classifications. Application classifications may be based on, for example, (a) the performance degradation an application would experience if a network failure were to cause the application to tear down and reconstruct a stateful connection, (b) cost to the business if a mission critical application were to fail, (c) user dissatisfaction when a real-time application is delayed while having to re-establish a connection, or (d) classification based on a type of user associated with a request being processed by an application. Multiple applications sharing a common application classification may be assigned the same FIP.

In addition, FIPs may be defined dynamically for each individual application. The mapping of network adapters to a dynamically created FIP may be based on the classification of the individual application. If the attributes of an application change during the execution of the application program, the FIP assigned to it may be remapped to a different set of network adapters without interrupting the application and without affecting the operation of other applications that are assigned different FIPs.

Some embodiments described in this Specification and/or recited in the claims may not be included in this General Overview section.

2. IP Bonding

A connection between two communicating applications comprises two endpoints: one endpoint for each of the applications. When an application initiates a connection, the operating system assigns an IP address to the initiating application's endpoint for the connection. An application initiating the establishment of a connection is also referred to herein as a client application, or client for short. The assigned IP address determines which network adapter on the local host will be used for sending messages to and receiving from a target application (also referred to herein as a server application, or server for short). The assigned IP address provides a return address for the server application to send messages back to the client application. As used herein the phrase, "assigning an IP address to a connection" and "a connection assigned to an IP address" are used in reference to a particular application and is a shorthand expression for "assigning an IP address to a particular application's endpoint of a network connection."

Linux OS IP bonding provides a high availability mechanism in the OS IP layer, and Solaris provides IPMP. IP bonding may help continue a client connection with a server transparently, in the face of a network card fault, and prevent an application from having to perform the time-consuming work of re-establishing the connection (during which time, application-related work may be suspended). Linux OS and Solaris implementations of IP bonding are configured on an operating system level. Conventionally, floating IP addresses are assigned to an application connection without any consideration of the attributes, requirements, or constraints of the individual application, similar to how IP addresses are assigned by the operating system.

Embodiments described herein provide configurable levels of availability to individual applications based on characteristics of each application by building on top of operating system support for IP bonding.

3. Process Overview

FIG. 1 is a block diagram that illustrates components of the system, in accordance with one or more embodiments. Other embodiments may include more or less components. Functions or operations described with respect a particular component may instead by implemented or executed by other components. Accordingly, the illustrated example should not be construed to limit the scope of the claims.

System 100 comprises Host 110 and Host 120 communicating over a network 170. Host 110 and Host 120 may be computer systems including one or more processors, an operating system, and application programs. Each host may be a compute node or a server. In an embodiment, host 110 and host 120 may be servers, and the applications executing on the servers may receive requests from an application executing on a different host to perform a task.

Application 132 and Application 134 are application programs executing on host 110. Application 136 is an application program executing on host 120. In an embodiment, application 132 and/or application 134 may send messages to application 136 over network 170.

Network Adapters 152, 154, 156, and 158 are components of host 110 that connect host 110 to network 170. Messages sent to and received from applications executing on host 110 pass through one of network adapters 152, 154, 156, and 158 on the way to the network. Examples of a network adapter include a network interface card (NIC) or a host channel adapter. Network adapter 160 in FIG. 1 represents one or more network adapters that connect host 120 to network 170.

When an application requests a network connection over which to communicate with an application executing on a remote host, the Mapping Module 140 determines an IP address for the requesting application to use for the connection. In an embodiment, the application may explicitly request a FIP having a particular classification. For example, the application may request a high availability FIP or a fast FIP. In another embodiment, the application may supply information about the application which Mapping Module 140 may use to determine the kind of FIP to assign. In an embodiment, multiple threads of execution within an application may share an IP address that is assigned to the application. In another embodiment, individual threads may maintain separate (i.e. thread-specific) network connections within the application. Each thread may request, and be assigned, different IP addresses for separate connections. The assignment of a floating IP address to a thread-specific network connection may be based on a classification of the work being performed by the thread of execution or other characteristics of the thread. Hereinafter, discussion of assigning a floating IP to an application also pertains to assigning a floating IP to a thread of the application except when referring to application attributes that cannot be attributed to an individual thread.

Mapping module 140 assigns a floating IP address to the application based on attributes of the application. Mapping module 140 maintains a set of floating IP addresses and a mapping of each floating IP address (FIP) to one or more of network adapters 152, 154, 156, and 158. Each network adapter may be mapped to more than one FIP. FIG. 2A is a diagram that illustrates the association between floating IP addresses and one or multiple network adapters, in accordance with one or more embodiments. FIP1 is associated with four network adapters: NA1, NA2, NA3, and NA4. Any one of NA1, NA2, NA3, and NA4 may transmit traffic over a connection assigned to FIP1, Similarly, FIP2 is associated with two adapters: NA3, and NA4. Either one of NA3 or NA4 may transmit data over a connection assigned to FIP2. FIP3 is only mapped to NA4.

A FIP may be assigned a classification, and the set of network adapters to which a FIP is mapped may be selected based on the characteristics of the adapters relative to the needs indicated by the classification. For example, if "High Speed" is a classification, a High Speed FIP may be mapped to very fast network adapters. A "High Availability" FIP may be mapped to very reliable network adapters or a relatively large number of network adapters compared to other FIPs.

Classification of applications are used to assign a FIP with a compatible classification. For example, if an application is known to maintain a large amount of state associated with a connection, then shutting down and restarting the connection may require a great deal of work that would delay the functioning of the application. Based on the expense of losing the connection, the application may be classified as high cost. An example of a high cost application may be a database application with a heavy-weight session state. A different kind of application may be mission critical, requiring fault tolerance but not necessarily speed. Yet another kind of application may need speed, such as a streaming video application. The mapping module selects a FIP whose classification matches, or is consistent with, the application classification.

One example classification type is a priority level that indicates the relative need for fault tolerance among applications executing on the same host. For example, a priority may be assigned to an application based on what kind of database the application is connected to. Client applications connected to free, inexpensive database like MySQL may be assigned a lower priority than those connected to more expensive, premium database like Exadata. Priority assignment may also consider the tasks that the application performs. For example, applications operating in the context of an interactive user interface may be assigned a higher priority than an application generating a report in batch mode. An application operating on behalf of a privileged user, such as a system or database administrator, may be given higher priority than an operation executing on behalf of a user with normal privileges.

The mapping module may be implemented in user space or may be implemented in the operating system kernel. A user-space implementation may be operating-system independent.

At any one time, only one network adapter is used for transmitting data over a connection to which a FIP has been assigned. FIG. 2B is a diagram that illustrates the association between floating IP addresses and the corresponding network adapter currently in use, in accordance with one or more embodiments. At the snapshot of time represented in the example of FIG. 2B, traffic for a connection assigned FIP1 is transmitted and received over NA1, traffic for a connection assigned FIP2 is transmitted and received over NA3, and traffic for a connection assigned FIP1 is transmitted and received over NA4. In an embodiment, the address resolution table of FIG. 2B may resolve a floating IP address to a physical address of the network adapter currently in use. In an embodiment, the address resolution table may be used by an address resolution protocol (ARP). Hosts sending network traffic to a destination IP address may use the ARP protocol to request an associated Media Access Control (MAC) address of the network adapter being used for traffic to/from the floating IP address.

If a network adapter that is currently in use fails, mapping module 140 is notified before the application is notified. Mapping module 140 identifies FIPs that are currently using the failed network adapter. For each such FIP, another network adapter is selected from the list of network adapters mapped to the FIP. For example, NA4 is mapped to all FIPs 1, 2, and 3. If all FIPs are using NA4 when NA4 fails, then mapping module 140 may select one of NA2, NA3, or NA4 to replace NA4 in the FIP1 entry of the address resolution table. Application communication would continue over the connection assigned to FIP1 without the application having to shut down and restart the connection. Likewise, mapping module 140 may replace NA4 with NA3 for the FIP2 entry in the address resolution table. A connection assigned to FIP3 would fail, and the application would be notified, because there is no other network adapter to use.

A FIP may be assigned to a set of applications all sharing the same or substantially similar classifications. For example, application 132 and application 134 may each be a financial application that is run at the end of a fiscal time period such as end of month, end of fiscal quarter, and/or end of fiscal year. Both of these applications may be assigned a classification that would cause the same FIP to be assigned to each of them. The FIP assigned to multiple applications may be remapped to a different set of network adapters during the times when these applications are relied on to run and complete execution successfully in a bounded period of time.

Figure 3:
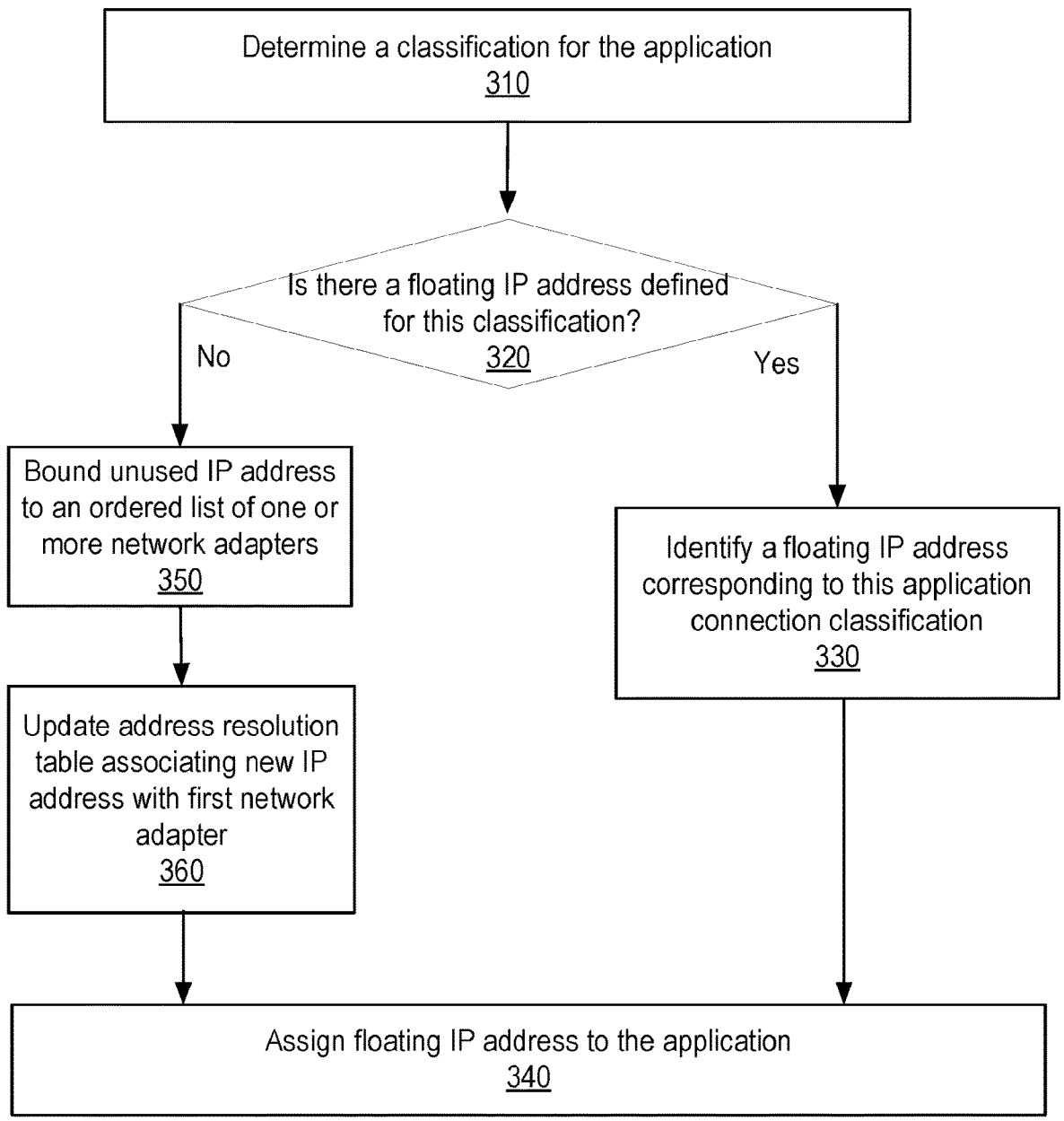
FIG. 3 is a flow diagram that illustrates the flow for assigning a floating IP address to an application, in accordance with one or more embodiments.

FIG. 3 is a flow diagram that illustrates the flow for assigning a floating IP address to an application connection, in accordance with one or more embodiments. When the mapping module receives a request to provide a FIP to an application, the mapping module uses information about the application to determine a classification for the application (Operation 310). In an embodiment, the mapping module may have access to configuration information indicating a mapping from a client id, received in the request, to a classification. Other information that may be obtained from the connection request, and used to map the application to a classification, may include the destination IP address and/or port number that indicates the type of service being requested. In an embodiment, a new connect call that accepts additional application attributes may be provided that directly interfaces with the mapping module to classify the application.

In addition, an application characteristics table may be configured with an event during which the application needs high availability. The mapping module may assign a FIP having a different classification during the event than at other times.

In an embodiment, the classification of an application may be based on directly measurable runtime statistics observed over time such as: (a) the size of session state, (b) the average length of a session, and (c) the amount of time to recover from a connection failure. This runtime information may be used to statically configure a classification. In an embodiment, these statistics may be automatically observed and recorded on an on-going basis while the application is executing. In an embodiment, an application classification may change during runtime, and the FIP may be re-bound to a different set of network adapters when the application classification changes. As an example, a long executing application may start with a small session state that would not take long to restart, and later as the session state grows, the cost to restart might increase, necessitating using a higher availability network adapter mapped to the FIP already assigned to the application connection. An application classification may be dynamically configured based on historical or current runtime characteristics. In an embodiment, statistics gathered at run time may be analyzed by a machine learning algorithm to determine an optimal classification for the application.

One example of machine learning is as described below. The mapping module can associate a threshold T1 for the number of pieces of session state that need to be re-created upon failover, and a threshold T2 for the time taken to recover during failover. The thresholds T1 and T2 may be determined based on past runtime measurements and heuristics. Such measurements taken for the running application may be compared to these thresholds. If the number of pieces of session state or estimated time to recover during a failover at a point during the execution exceeds the threshold values for T1 and T2 respectively, the application may be re-classified as high availability. Similarly, if the measurements taken for the executing application fall below either T1 or T2, the application may be re-classified as high speed.

In another embodiment, classification changes may require all thresholds to be met or exceeded. For example, in above case, the number of session states would need to exceed T1 and the recover time estimate would need to exceed T2 before reclassifying the application.

In one embodiment, these threshold checks may be computed periodically.

In an embodiment, a classification type may be one of a set of discrete values. For example, a priority classification may include values such as "High Priority", "Medium Priority", and "Low Priority." In another embodiment, a classification type may be determined by a function that outputs a continuous range of values. Predetermined value ranges associated with classification values may be used to map a continuous value to a corresponding FIP.

In Operation 320, the mapping module looks in the table to determine if there is already a FIP defined that matches or is consistent with the classification of the application. If there is at least one, then in Operation 330, the mapping module selects a FIP having a consistent classification. Then, in Operation 340, the selected FIP is assigned to the application connection.

If in Operation 320, there is no FIP having a matching classification, then in operation 350, the mapping module may: (a) allocate a FIP that is not currently in use, (b) assign a classification to the new FIP according to the classification of the application, and (c) map the newly allocated FIP to a set of one or more network adapters to provide a level of service according to the classification. When private IP addresses are being used, a new FIP address may be created dynamically that does not conflict with any private IP address already in use. Public IP addresses, however, need to be published so that other hosts can route traffic destined for the host associated with the public IP address. Because of the requirement to publish before using, a pool of published, but yet-unused, FIP addresses may be maintained. When a new FIP is needed, an IP address from the pool may be selected and used as the new FIP. When a FIP is no longer being used, it may be returned to the pool.

In Operation 360, the new FIP is added to the address resolution table along with a selected one of the network adapters associated with the FIP, and in Operation 340, the newly allocated FIP is assigned to the application's connection endpoint.

Figure 4:
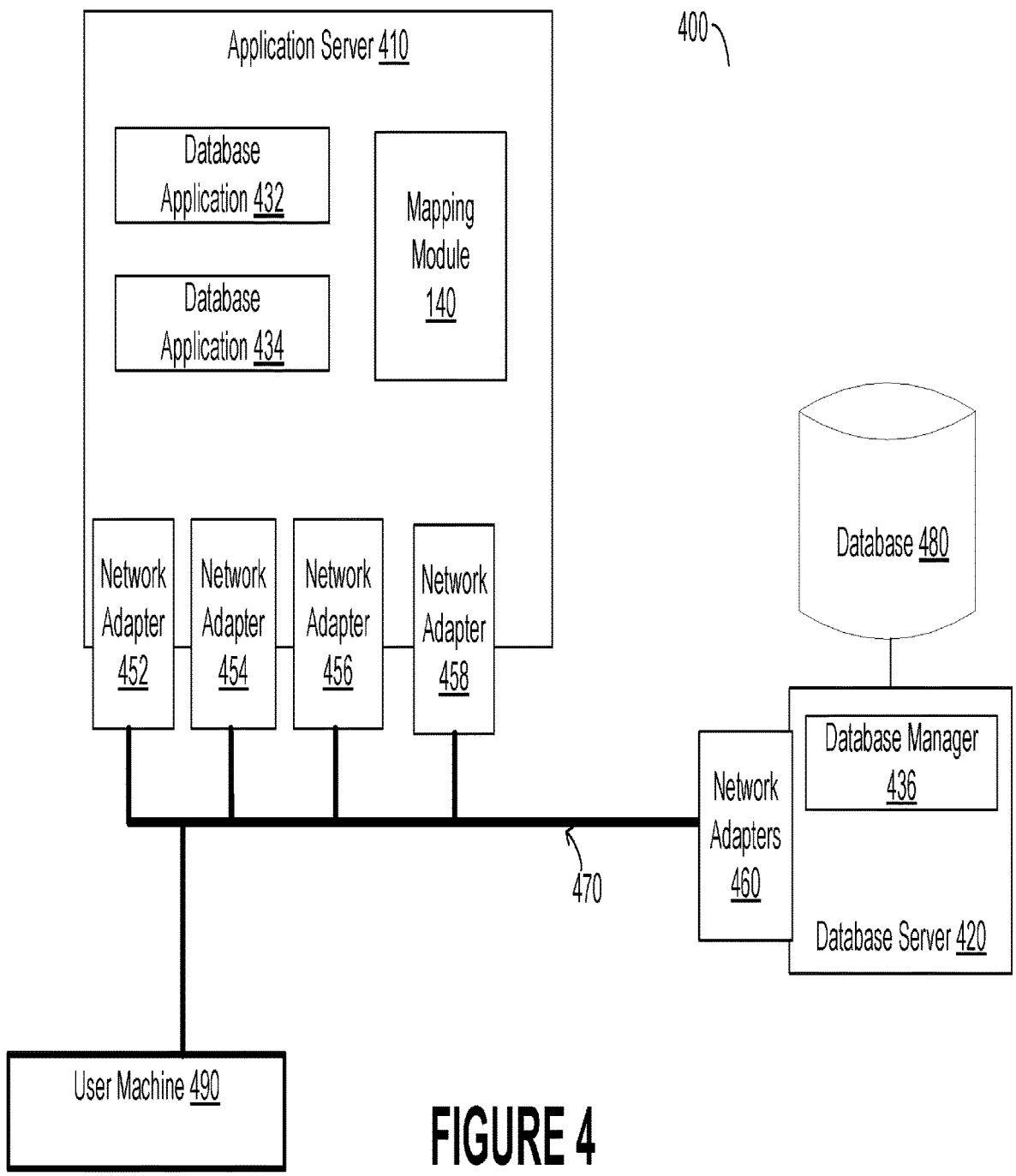
FIG. 4 is a block diagram that illustrates an example system of applications executing on an application server communicating with a database manager executing on a database server, in accordance with one or more embodiments.

FIG. 4 is a block diagram that illustrates an example system of database applications 432 and 434 executing on an application server 410 and issuing database queries over the network 470 to Database Manager 436, executing on database server 420, in accordance with one or more embodiments. Database manager 436 processes the queries against Database 480 and returns a response to the querying application over network 470. Database application 432 may generate a report using data from database 480, add transactions records to the database, or modify or delete existing records in the database.

Network Adapters 452, 454, 456, and 458 are components of application server 410 that connect application server 410 to network 470. Messages sent to and received from applications executing on application server 410 pass through one or more of the network adapters 452, 454, 456, and 458. Network adapter 460 represents a network adapter that connects database server 420 to network 470. When a database application requests a network connection over which to communicate with the database manager, mapping module 140 assigns a floating IP address to the database application connection based on attributes of the application. Mapping module 140 maintains a set of floating IP addresses and a mapping of each floating IP address (FIP) with one or more of network adapters 452, 454, 456, and 458.

4. Using a Pool of Connections

The above sections are directed to assigning appropriate networking resources for a new network connection. In an embodiment, when an application releases the use of a network connection that is associated with a FIP, the released network connection may be preserved in a pool of connections rather than tearing down the connection. Each network connection in the pool may still be associated with (a) an IP address and port number on the destination server, (b) the FIP it was assigned at the time the connection was established, and (c) the hardware resources assigned to the FIP. The port number may be associated with a particular server running on the server host. Subsequently, when an application requests a new network connection to a specified endpoint (that is, a connection to a particular server running on a particular server host), a connection in the pool may be reused rather than establishing a new connection to the specified endpoint. Thus, multiple network connections may exist in the pool of connections, and each connection may be associated with a FIP. A network connection may be selected from the pool based on being associated with a FIP that is compatible with the requirements of the application.

The use of a connection pool may be realized in diverse ways to accommodate the needs of the applications running in the environment. In one embodiment, the environment may include short-lived applications that request a connection at start-up and hold onto the connection until the application terminates. That is, the network connection may be released upon application termination. Network connections may be reused among applications that connect to the same endpoint. However, applications using connections to the same database instance may operate on behalf of different user identities. Each such application may establish its own session state over a reused network connection, and when the application terminates, the session state may be released while the network connection may be retained in a pool of connections.

In another embodiment, multiple short-lived applications may cooperate to achieve a common goal. These cooperating applications may need the same session state, for example, logging in as the same user, having the same environment (such as language and time zone settings), and using the same in-memory data structure or application resources (such as an open database table). In this embodiment, the session state created with the server may also be reused across applications. When an application releases a connection having associated session state, the session may also be preserved in association with the connection that is pooled. When an application is assigned a pooled connection associated with the desired session state, the application need not re-create the state. Avoiding state initialization may reduce the application initialization time and enhance performance. The network connection/session pair selected for assignment to an application may be selected based on matching the associated FIP with the requirements of the application.

In another embodiment, the environment may comprise several long-lived applications that only infrequently require a network connection to a particular endpoint. Rather than having each long-lived application monopolize a connection for the duration of the application's execution, such an application may request a connection just before needing to communicate with the endpoint, and release the connection just after the communication is finished. This may happen repeatedly during the execution of the application. In that way, a pool of connections to a common endpoint may be shared among multiple applications while the applications are still running, with only one application assigned to a particular connection at a time. In an embodiment, the long lived applications may interact with the server on behalf of different user identities, and thus, it may not be appropriate to reuse session state. For long-running applications, characteristics and needs of an application can change over time. A FIP associated with a previously-used connection may be inappropriate for a currently requested connection. When characteristics change during a continuous execution of an application, a different FIP may be selected, resulting in selecting a different connection from the pool.

In an embodiment, if none of the available connections in the pool are associated with a FIP having characteristics that match an application requesting a connection, a new network connection may be created and associated with an appropriate FIP. In an embodiment, if the pool of connections is full, a connection in the pool may be released to make space to store the newly created connection.

In each of the foregoing application environments, the mapping module may manage the pool of connections and may be involved in selecting a network connection from a pool of connections according to the associated FIP. In an embodiment, the new network connection will be used to establish a database connection. A database connection is a connection to a particular database manager running on a particular database server. The database connection may or may not have associated database session state. Database applications are assigned database connections by a database driver. A database driver may manage a pool of connections for database endpoints. In an embodiment, the database driver may be implemented to provide the above-described functionality of the mapping module for managing a pool of database connections, with each connection having an associated FIP. In another embodiment, a database driver may invoke an application-independent mapping module to perform FIP-based connection pool management for database connections. The mapping module may be accessible to any and all application drivers that may benefit from the mapping module functionality such that it is not necessary to add the mapping module functionality into each driver individually.

In an embodiment in which an application does not use an application driver, the application may invoke an independent mapping module that may maintain a pool of network connections having different endpoints. The independent mapping module may select a requested connection from the pool based on the required endpoint as well as the characteristics of the connection's associated FIP.

Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is labeled with a tenant ID. A tenant is permitted access to a particular network resource only if the tenant and the particular network resources are associated with a same tenant ID.

In an embodiment, each tenant is associated with a tenant ID. Each application, implemented by the computer network, is labeled with a tenant ID. Additionally or alternatively, each data structure and/or dataset, stored by the computer network, is labeled with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be labeled with a tenant ID. Only a tenant associated with the corresponding tenant ID may access data of a particular database. As another example, each entry in a database implemented by a multi-tenant computer network may be labeled with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
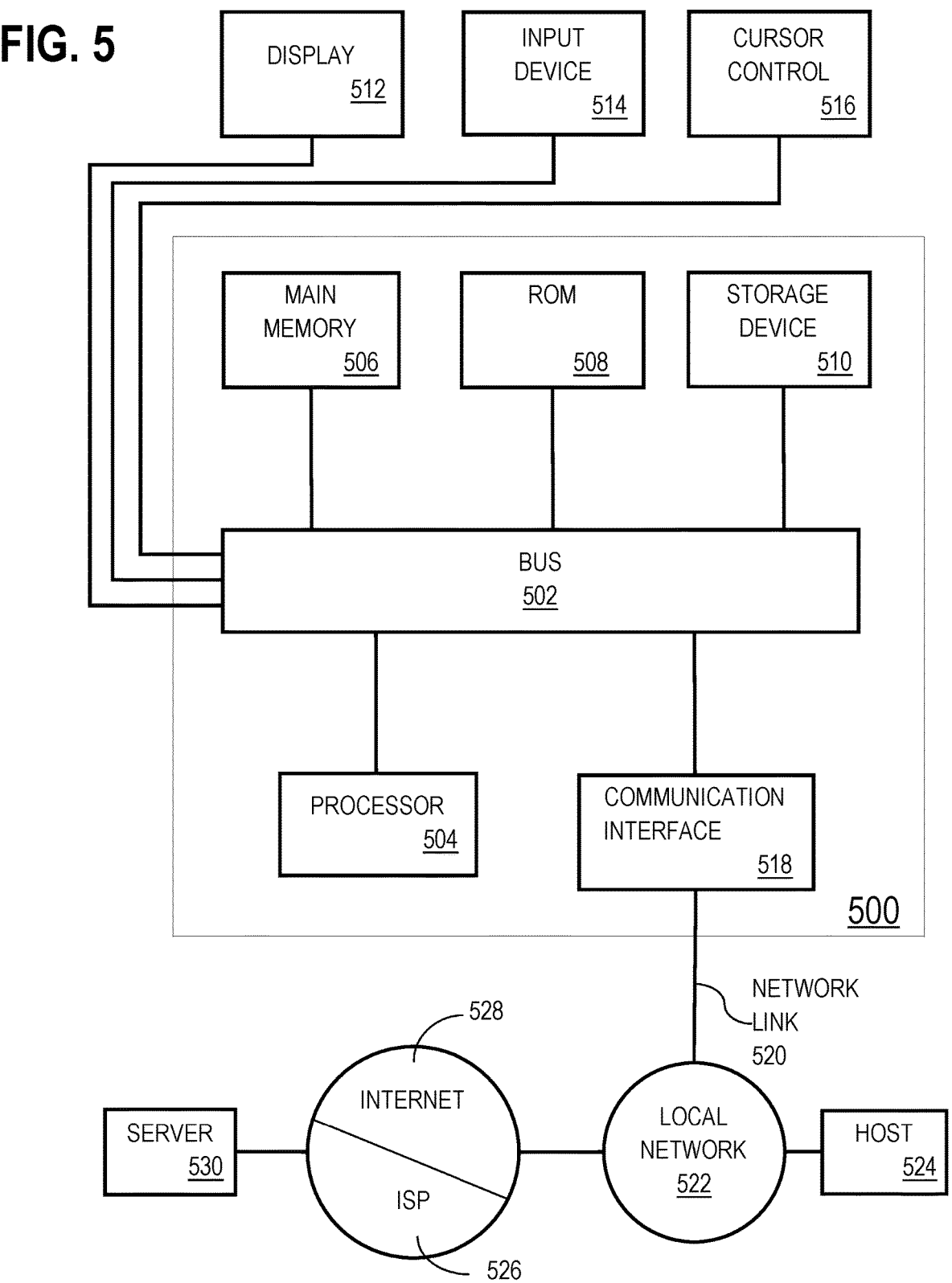
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   selecting a first level of service for a floating IP address;
   selecting a first set of network adapters, meeting the first level of service, for assigning to the floating IP address;
   assigning the first set of network adapters to the floating IP address for processing packets addressed to the floating IP address;
   selecting a new level of service for the floating IP address that is different than the first level of service currently selected for the floating IP address;
   responsive to selecting the new level of service for the floating IP address: selecting a second set of network adapters, meeting the new level of service, for assigning to the floating IP address; and
   assigning the second set of network adapters to the floating IP address for processing packets addressed to the floating IP address.

2. The method of claim 1, further comprising:
   selecting the first set of network adapters in response to determining that a first set of performance characteristics, associated with the first set of network adapters, meet the first level of service; and
   selecting the second set of network adapters in response to determining that a second set of performance characteristics, associated with the second set of network adapters, meet the new level of service.

3. The method of claim 2, wherein the first set of performance characteristics and the second set of performance characteristics comprise one or both of connection reliability and connection speed.

4. The method of claim 1, wherein the floating IP address is assigned to an application that is being executed, and
   wherein switching from the first set of network adapters to the second set of network adapters does not interrupt an ongoing execution of the application.

5. The method of claim 4, wherein the second set of network adapters is further selected responsive to detecting a change in attributes of the application.

6. The method of claim 5, wherein detecting the change in attributes comprises detecting a change in a classification of the application.

7. The method of claim 4, wherein:
   the floating IP address is assigned to the application responsive to the application receiving a request for service from a user of the application; and
   assigning the floating IP address is based on credentials associated with the user requesting service.

8. The method of claim 4, wherein the floating IP address is one of a plurality of floating IP addresses,
   the method further comprising:
   maintaining a plurality of connections associated with the application, wherein each connection in the plurality of connections is associated with a different floating IP address from the plurality of floating IP addresses; and
   selecting one of the plurality of connections to execute a task associated with the application.

9. The method of claim 4, wherein the application comprises a plurality of threads of execution, a first thread of the plurality of threads of execution associated with a first network connection, and a second thread of the plurality of threads of execution associated with a second network connection distinct from the first network connection; and
   the method further comprising:
   assigning the floating IP address based on attributes associated with the first thread of the application, assigning a second floating IP address based on attributes associated with the second thread of the application,
   wherein first thread uses the floating IP address for communication over the first network connection, and the second thread uses the second floating IP address for communication over the second network connection.

10. The method of claim 4,
    wherein the application is a first database application executing on an application server, the database application communicating over a particular database connection with a database management application executing on a database server;
    wherein the application server uses the floating IP address as a source address for a particular network connection to communicate with a database server; and
    the method further comprising:
    the database application relinquishing the particular database connection, and the particular database connection returning to a pool of database connections;
    a second database application executing on the application server requesting a database connection to the database management application;
    selecting the particular database connection from the pool of database connections based on:
    (a) attributes of the second database application, and
    (b) a classification associated with the floating IP address used as the source address for the particular network connection to communicate with the database server; and
    assigning the particular database connection to the second database application.

11. The method of claim 4, wherein the application is a first application that communicates with a second application over a common subnetwork;
    wherein the floating IP address is a private IP address that is:
    (a) allocated after receiving a request to assign a floating IP address to the application, and
    (b) not in use when the request to assign a floating IP address to the application is received.

12. The method of claim 4, wherein the application is a first application on a first subnetwork that communicates with a second application on a second subnetwork that is different from the first subnetwork;
wherein the floating IP address is a public IP address, and at the time a request to assign a floating IP address to the application is received:
(a) the floating IP address was previously included in a routing table; and
(b) the floating IP address is not bonded to a network adapter.

13. The method of claim 1, the method further comprising:
terminating usage of the floating IP address responsive to detecting that the floating IP address is not assigned to any network connection.

14. A non-transitory computer readable medium comprising instructions which, when executed by one or more hardware processors, causes performance of operations comprising:
selecting a first level of service for a floating IP address;
selecting a first set of network adapters, meeting the first level of service, for assigning to the floating IP address;
assigning the first set of network adapters to the floating IP address for processing packets addressed to the floating IP address;
selecting a new level of service for the floating IP address that is different than the first level of service currently selected for the floating IP address;
responsive to selecting the new level of service for the floating IP address: selecting a second set of network adapters, meeting the new level of service, for assigning to the floating IP address; and
assigning the second set of network adapters to the floating IP address for processing packets addressed to the floating IP address.

15. The medium of claim 14, the operations further comprising:
selecting the first set of network adapters in response to determining that a first set of performance characteristics, associated with the first set of network adapters, meet the first level of service; and
selecting the second set of network adapters in response to determining that a second set of performance characteristics, associated with the second set of network adapters, meet the new level of service.

16. The medium of claim 15, wherein the first set of performance characteristics and the second set of performance characteristics comprise one or both of connection reliability and connection speed.

17. The medium of claim 14, wherein the floating IP address is assigned to an application that is being executed, and
wherein switching from the first set of network adapters to the second set of network adapters does not interrupt an ongoing execution of the application.

18. The medium of claim 17, wherein the second set of network adapters is further selected responsive to detecting a change in attributes of the application.

19. The medium of claim 18, wherein detecting the change in attributes comprises detecting a change in a classification of the application.

20. A system comprising:
one or more hardware processors;
a memory storing instructions which, when executed by the one or more hardware processors, cause:
selecting a first level of service for a floating IP address;
selecting a first set of network adapters, meeting the first level of service, for assigning to the floating IP address; assigning the first set of network adapters to the floating IP address for processing packets addressed to the floating IP address;
selecting a new level of service for the floating IP address that is different than the first level of service currently selected for the floating IP address;
responsive to selecting the new level of service for the floating IP address:
selecting a second set of network adapters, meeting the new level of service, for assigning to the floating IP address; and
assigning the second set of network adapters to the floating IP address for processing packets addressed to the floating IP address.

* * * * *